April 8, 1947.  M. E. COLLINS  2,418,544
PAD ROLLER ASSEMBLY
Filed May 20, 1944
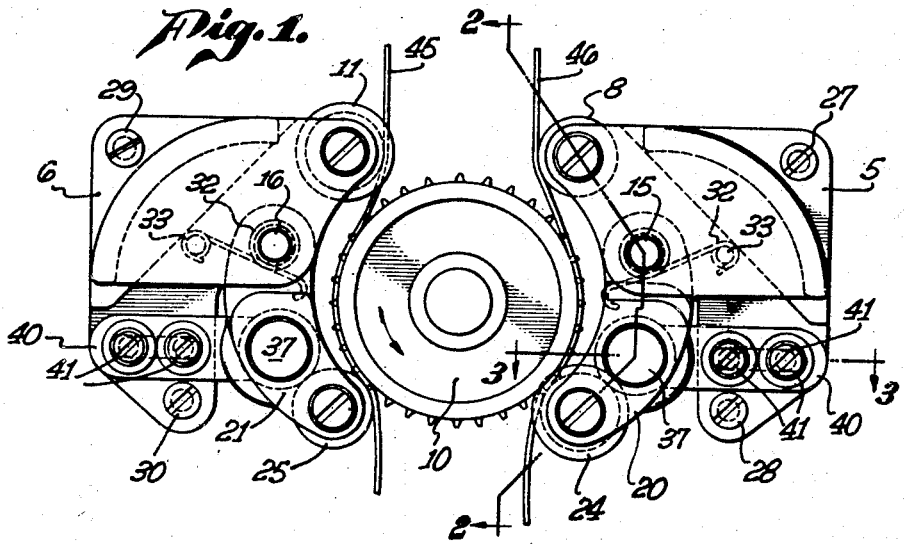
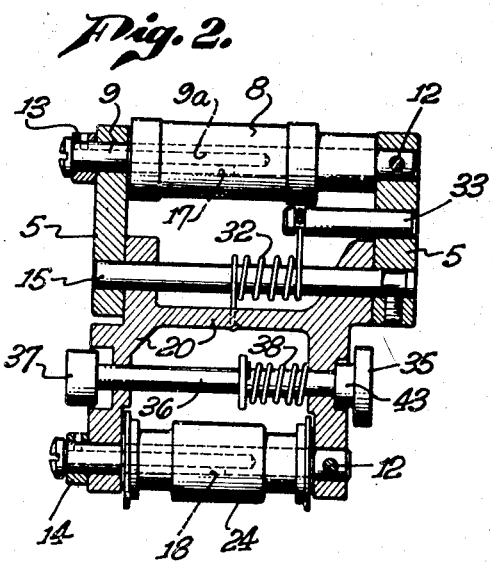
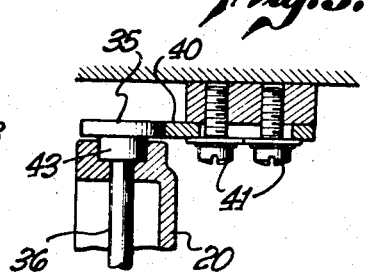
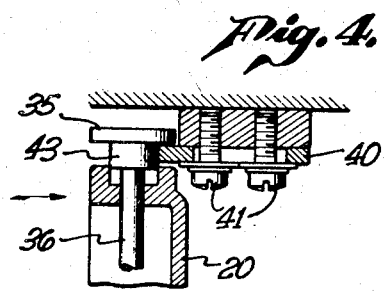
MILFORD E. COLLINS,
INVENTOR.
BY
ATTORNEY.

Patented Apr. 8, 1947

2,418,544

UNITED STATES PATENT OFFICE 2,418,544

PAD ROLLER ASSEMBLY

Milford Edwin Collins, Los Angeles, Calif., assignor to Radio Corporation of America, a corporation of Delaware Application May 20, 1944, Serial No. 536,461

7 Claims. (Cl. 271—2.3)

This invention relates to motion picture apparatus, and particularly to pad rollers for maintaining a film on a drive sprocket or roller.

In motion picture equipment, a film having picture images and/or sound images thereon is driven through various types of apparatus, such as picture projectors, sound recorders, and sound reproducers, by means of sprockets having teeth on one or both ends thereof for engaging the film in its perforations longitudinally disposed near the edges of the film. As the film must be advanced at as constant and uniform a speed as possible, particularly past the translation points in the sound recording and reproducing units, it becomes essential that the film pass over the sprockets in a smooth and uniform manner. One of the factors which produces uniform film travel is the guidance and maintenance of the film on the sprockets at the proper position. It is, of course, usual in the art to use pad rollers for this purpose, the present invention being directed to an improved form of pad roller construction which provides flexibility and simplicity of operation.

The pad roller assembly of this invention includes two rollers, one of which is fixedly mounted with respect to the sprocket or roller over which it guides the film, and the other of which is mounted on an arm pivotally mounted on the pad roller assembly frame. The pad roller may be made in both right and left-hand forms for use on the same sprocket. Since, in certain film drives, it is desirable to have the pad rollers which guide the film to the sprocket act as edge guide rollers, the present invention utilizes for this purpose one fixed roller and one adjustable roller, the latter being locked in fixed operative position. Provision is made, however, for positioning the adjustable rollers at a distance from the sprocket so that the film may be threaded thereover.

The present invention simplifies this adjustment of the rollers by providing a pin which not only locks the roller in operative position, but which may be manually moved longitudinally to release the roller so that it may be moved away from the sprocket to the threading position by means of a spring. The roller is manually adjusted to its operative position where the pin is urged to its locking position by a second spring. A simplified means for adjusting the position of the roller with respect to the sprocket and in which the roller is locked is also a feature of the present invention.

The principal object of the invention, therefore, is to facilitate the maintenance of the film on a driving sprocket or roller.

Another object of the invention is to provide an improved pad roller assembly which involves flexibility and simplicity of operation.

A further object of the invention is to provide an improved pad roller assembly which may be easily adapted to hold a single film on two portions of a sprocket or two films on the same sprocket.

A further object of the invention is to provide an improved pad roller assembly which is easily attachable and detachable from a film apparatus, and is easily adjustable to facilitate the threading of the film over the sprockets.

A still further object of the invention is to provide an improved pad roller structure which uses different types of rollers with respect to the direction of film travel.

Although the novel features which are believed to be characteristic of this invention will be pointed out with particularity in the appended claims, the manner of its organization and the mode of its operation will be better understood by referring to the following description read in conjunction with the accompanying drawings forming a part hereof, in which:

Fig. 1 is an elevational view, partially in cross section, of a right and left-hand sprocket assembly embodying the invention.

Fig. 2 is a cross sectional view of the right-hand assembly of Fig. 1 taken approximately along the line 2—2 thereof.

Fig. 3 is a detail view showing the locking arrangement when the adjustable pad roller is in locked or operative position taken along the line 3—3 of Fig. 1, and Fig. 4 is a detail view of the same elements shown in Fig. 3 when the pad roller is in threading position.

Referring now to the drawings in which the same numerals identify like elements, the right and left-hand pad roller assemblies for holding a film or films on a sprocket 10 have U-shaped frames 5 and 6. At the upper left-hand corner of frame 5, a roller 8 is mounted on its shaft 9 (see Fig. 2), while at the upper right-hand corner of frame 6, a roller 11 is mounted on a similar shaft. These shafts are pinned to or fastened by set screws to the frame as shown at 12, and are longitudinally drilled and plugged as shown by the dotted lines 9a to permit oiling. Oil is inserted through holes at the end of the shafts under sleeves 13 and 14, and it runs along the shafts to holes 17 and 18 at the centers of the shafts.

Near the centers of the frames 5 and 6, pivot shafts 15 and 16 are provided on which are pivoted H-shaped arms 20 and 21. At the lower end of the arms 20 and 21 are pad rollers 24 and 25, respectively.

The frames 5 and 6 are readily mounted on the back wall of a picture projector, sound reproducer, or recorder by means of screws or bolts 27 and 28 for frame 5, and screws 29 and 30 for frame 6.

Referring now to Fig. 2, a coil spring 32 is wrapped around shaft 15, one end of the spring being hooked over a cross member of the arm 20, and the other end of the spring being hooked over a pin 33 in one side of the frame 5. The tension of the spring is such as to urge the roller 24 away from the sprocket 10. A similar arrangement is provided for the left-hand assembly. To maintain the roller 24 locked in operative position adjacent the sprocket 10, the enlarged end 35 of a push-pin 36, which, as shown in Fig. 2, is urged to the left by a coil spring 38. The enlarged portion 35 of a push-pin 36 is adapted to abut a stop plate 40 adjustable on the frame 5 by screws 41 in an elongated slot in the plate. Thus, when the arm 20 is manually moved to the left in Fig. 1, the portion 35 takes the longitudinal position shown in Fig. 3 by action of a spring 38, which urges the pin 36 to the left in Fig. 2 and downwardly in Figs. 3 and 4. When the pin is so moved, the roller 24 is locked in its operative position adjacent the sprocket 10. Any desired clearance between the roller 24 and sprocket 10 may be predetermined by adjusting the stop plate 40 on the frame 5.

To remove the roller 24 to threading position, it is only necessary to push the pin 35 longitudinally toward the assembly against the tension of spring 38 by pressure on the head 37 which permits the end portion 35 to pass under the stop plate 40 and abut a smaller diameter portion 43 on the pin 36. The roller 24 is then spaced sufficiently from the sprocket 10 to permit easy threading of the film around the sprocket 10. Thus, by adjusting the stop member 40, both the operative and threading positions of the roller 24 are simultaneously predetermined. The left-hand assembly has similar adjustments. It will be noted that rollers 8 and 11 are sufficiently spaced from the sprocket to permit threading while in their operative positions.

Another feature of the present sprocket assembly is the disposition of the types of rollers on the sprocket. It will be noted in Figs. 1 and 2 that the film 45 on the left side of the sprocket approaches the sprocket 10, in view of the direction of rotation of sprocket 10 as shown by the arrow, over a flanged roller 11 which will edge guide the film to the sprocket teeth, while the roller 25 at the point of departure of the film is of the non-flanged type. Similarly on the right-hand side of the sprocket where the film 46 approaches the sprocket, the roller 24 is of the flange type for edge guiding the film onto the sprocket while the roller 8, which controls the departure of the film from the sprocket, is of the same type as roller 25, since these rollers need only provide the film with the necessary wrap around the sprocket.

The above pad roller construction is particularly simple and efficient in providing proper guidance of the film to the sprocket and the necessary wrap of the film around the sprocket. The mechanism of locking the lower rollers in position is simple, while the removal of the roller from the sprocket for threading purposes is accomplished very quickly. The adjustable rollers may be locked in their operative positions and these locked positions can be easily predetermined in a simple manner. The determination of the operative setting of the rollers simultaneously determines their threading positions, so only one adjustment is required.

I claim as my invention:

1. A double pad roller assembly for guiding film on and off of a sprocket, comprising a U-shaped frame, a fixed shaft mounted in one corner of said frame, a rotatable roller on said shaft, said roller being spatially disposed with respect to said sprocket, a second shaft mounted near the center of said frame, a curved H-shaped arm having one end thereof pivotally mounted on said second shaft, a roller mounted on the other end of said arm and adapted to be moved toward and away from said sprocket to wrap the film guided to said sprocket around said sprocket, resilient means urging said roller away from said sprocket, and means for positively locking said arm and last-mentioned roller in its operative position adjacent said sprocket and to release said roller for movement away from said sprocket under the action of said resilient means.

2. A double pad roller assembly in accordance with claim 1 in which said last-mentioned means includes a push-pin mounted coaxially with said movable roller.

3. A pad roller assembly for guiding film on a sprocket, comprising a U-shaped frame, a shaft mounted between the sides of said frame, an H-shaped arm having one end thereof pivoted on said shaft, a roller mounted on the other end of said arm, a spring urging said arm and roller away from said sprocket, and a pin and stop combination for locking said arm in a predetermined operative position with respect to said sprocket.

4. A pad roller assembly in accordance with claim 3 in which said pin and stop combination includes means for locking said arm in a predetermined film threading position, and means for resiliently urging said pin toward a position which locks said roller in operative position.

5. A pad roller assembly in accordance with claim 3 in which said pin has portions of two diameters for contacting said stop, one portion of said pin determining the operative position of said roller with respect to said sprocket and the other pin portion determining the threading position of said roller, and resilient means are provided for urging said pin to a position which locks said roller in operative position.

6. A double pad roller construction comprising a frame, a shaft near the center of said frame, a curved H-shaped arm having the ends of two legs thereof pivoted on said shaft, a rotatable roller mounted in one corner of said frame and adapted to guide a film on said sprocket, a rotatable roller mounted between the ends of the other legs of said arm, a pin mounted between said second mentioned roller and the central portion of said arm and adapted to be moved longitudinally, said pin having two portions of different diameters, a stop member attached to said frame adapted to contact said portions of said pin depending upon the longitudinal position thereof with respect to said stop member, and resilient means for urging said pin to a position to maintain said roller in operative position.

7. A double pad roller construction in accordance with claim 6 in which means are provided for adjusting said stop member on said frame to predetermine the positions of said rotatable roller when either of said pin portions are in contact therewith.

MILFORD EDWIN COLLINS.

REFERENCES CITED

The following references are of record in the file of this patent:

UNITED STATES PATENTS

| Number | Name | Date |
| --- | --- | --- |
| 2,073,224 | Ross | Mar. 9, 1937 |
| 1,483,319 | Swartz | Feb. 12, 1924 |
| 1,957,164 | Frappier et al. | May 1, 1934 |
| 2,074,686 | Ferrand | Mar. 23, 1937 |
| 2,164,748 | Loomis et al. | July 4, 1939 |
| 2,273,024 | De Vry et al. | Feb. 14, 1942 |